United States Patent [19]

Duell

[11] 3,847,268

[45] Nov. 12, 1974

[54] IDENTIFICATION DEVICE ON A CONVEYOR BAND

[75] Inventor: Norman Leroy Duell, Fulton, N.Y.

[73] Assignee: Societe D'Assistance Technique Pour Products Nestle S.A., Lausanne, Switzerland

[22] Filed: June 11, 1973

[21] Appl. No.: 368,640

[52] U.S. Cl. .................................................. 198/40
[51] Int. Cl. ............................................. B65g 43/00
[58] Field of Search ............................... 198/38, 40; 141/154–162; 53/75, 76; 209/90

[56] References Cited
UNITED STATES PATENTS
1,990,050   2/1935   Schenk et al. ......................... 198/38

Primary Examiner—Allen N. Knowles
Assistant Examiner—Hadd Lane
Attorney, Agent, or Firm—Watson Leavenworth Kelton & Taggart

[57] ABSTRACT

Identification device of goods on a conveyor band having several supply stations at spaced longitudinal locations along the course of the conveyor, comprising a series of substantially parallel rails placed above said conveyor band and extending longitudinally of the conveyor, an end of each rail being curved to define a terminus thereof substantially opposite each station, and a series of switches each having actuating means placed between two adjacent rails.

2 Claims, 2 Drawing Figures

IDENTIFICATION DEVICE ON A CONVEYOR BAND

The invention relates to an identification device of goods on a conveyor band.

When a conveyor band carries various goods, for example cases, coming from different sources, for example packing stations, it may be necessary to identify the origin of the goods along a conveyor band, for example in association with a weighing operation in order to detect the origin of the goods which are over or underweight.

The identification device on a conveyor band having several supply stations at spaced longitudinal locations along the course of the conveyor according to the invention comprises a series of substantially parallel rails placed above said conveyor band and extending longitudinally of the conveyor, the rails being laterally spaced in respect of said conveyor, an end of each rail being curved to define a terminus thereof substantially opposite each station, and a series of switches each having actuating means placed between two adjacent rails.

The annexed drawing represents, by way of example, an embodiment of the invention.

A conventional conveyor band 1 is supplied by several longitudinally spaced packing stations 21, 22, 23, 24 and 25.

Figure 1:
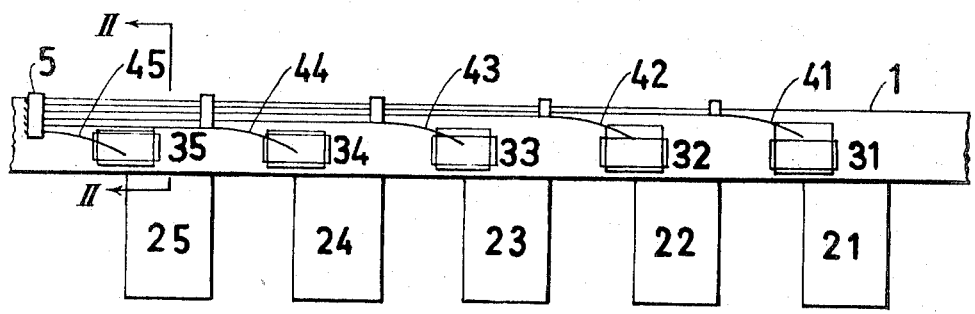
FIG. 1 represents a top plan view of a device according to the invention.

Cardboard boxes 31 to 35 with flaps at the top coming from these packing stations are carried by the conveyor band from right to left (FIG. 1). Above the conveyor band is placed a series of substantially parallel rails 41, 42, 43, 44 and 45, the rails being of staggered lengths to have an end associated with each station, the end of each rail being curved to define a terminus thereof substantially opposite its respective station. At the outlet side of the conveyor is placed a series of switches 5, each having an actuating finger placed between two adjacent rails.

Figure 2:
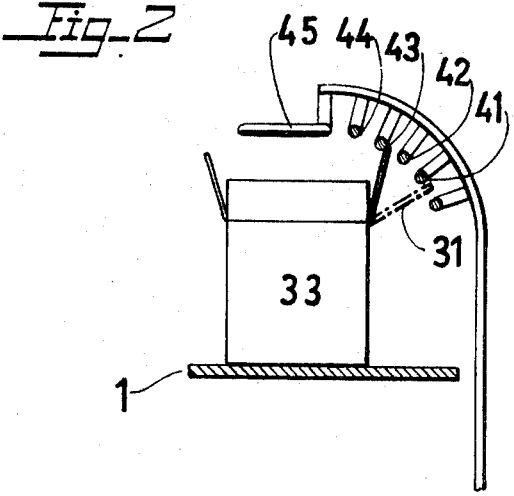
FIG. 2 is an enlarged vertical section through II-II of FIG. 1.

The operation of the device is as follows:

When a box delivered from a particular station arrives at the end of the station associated rail, its lateral flap engages with the curved end of the rail to be held between it and an adjacent rail (FIG. 2). When this box arrives at the switches, the flap actuates the finger of a switch. Depending on the origin of the box, its flap will engage the end of rail 41, 42, 43, 44 or 45 and will actuate the corresponding switch. This identifies the origin of the box when it passes the series of switches. The switches may be associated by known means with a weighing device for example, allowing to identify where boxes which are over- or underweight come from and to check the packing station accordingly.

Instead of actuating the switches with a flap of the cases, the goods could actuate the switch with any protrusion thin enough to glide between two adjacent rails.

In another embodiment, photocells are placed between two adjacent rails instead of actuating fingers.

I claim:

1. Apparatus for identifying the station origin of a box having lateral and transverse closure flaps delivered with at least its lateral flaps in an open position onto a traveling conveyor from one of a series of delivery stations, said apparatus including:

a corresponding series of parallel rails disposed above and extending longitudinally of said conveyor, said rails further being spaced laterally of said conveyor, the rails being of staggered lengths to have each end associated with a predetermined station, the said end of each rail being curved to define a terminus thereof substantially opposite its respective associated station whereby a lateral flap of a box entering said conveyor from the associated station is caused to engage the correspondingly associated rail to be held between it and an adjacent rail, and a corresponding series of swithces disposed downstream of said stations and each having switch actuating means extending between the rail associated therewith and a rail adjacent thereto whereby a box flap held between said associated rail and rail adjacent thereto will operate said switch actuating means during the travel of said box on said conveyor.

2. The apparatus of claim 1 in which said switch actuating means includes a box flap engageable actuating finger extending between each rail and rail adjacent thereto.

* * * * *